United States Patent
Nuske

(10) Patent No.: US 10,537,126 B2
(45) Date of Patent: Jan. 21, 2020

(54) SAUSAGE PRODUCTS

(76) Inventor: Andreas Nuske, Donaueschingen (DE)

(*) Notice: Subject to any disclaimer, the term of this patent is extended or adjusted under 35 U.S.C. 154(b) by 207 days.

(21) Appl. No.: 13/502,441

(22) PCT Filed: Oct. 20, 2010

(86) PCT No.: PCT/EP2010/065827
§ 371 (c)(1),
(2), (4) Date: Apr. 17, 2012

(87) PCT Pub. No.: WO2011/048160
PCT Pub. Date: Apr. 28, 2011

(65) Prior Publication Data
US 2012/0294982 A1    Nov. 22, 2012

(30) Foreign Application Priority Data
Oct. 21, 2009  (DE) .......... 10 2009 050 245

(51) Int. Cl.
| | | |
|---|---|---|
| A23L 1/317 | (2006.01) | |
| A23L 17/00 | (2016.01) | |
| A23L 13/50 | (2016.01) | |
| A23L 13/60 | (2016.01) | |
| A23L 13/40 | (2016.01) | |
| A23L 33/12 | (2016.01) | |

(52) U.S. Cl.
CPC .......... *A23L 17/70* (2016.08); *A23L 13/424* (2016.08); *A23L 13/43* (2016.08); *A23L 13/52* (2016.08); *A23L 13/65* (2016.08); *A23L 13/67* (2016.08); *A23L 33/12* (2016.08); *A23V 2002/00* (2013.01)

(58) Field of Classification Search
CPC ........ A23L 13/424; A23L 13/67; A23L 13/65; A23L 33/12; A23L 17/70; A23L 13/43; A23L 13/52
USPC ........................ 426/73, 643, 646, 518, 542
See application file for complete search history.

(56) References Cited

U.S. PATENT DOCUMENTS

| | | | |
|---|---|---|---|
| 6,235,331 B1 * | 5/2001 | Kataoka ............... | A23D 7/02 424/523 |
| 2008/0095897 A1 * | 4/2008 | Abril .................. | A23L 33/12 426/92 |
| 2008/0268112 A1 * | 10/2008 | Rolan et al. .................. | 426/250 |
| 2010/0173062 A1 * | 7/2010 | Eisner et al. ................. | 426/574 |
| 2010/0291267 A1 * | 11/2010 | Nissing ................ | A23L 27/201 426/72 |

FOREIGN PATENT DOCUMENTS

| | | |
|---|---|---|
| DE | 29719022 U1 | 2/1998 |
| DE | 102007025847 A1 | 12/2008 |
| EP | 11048227 A1 | 11/2000 |
| EP | 1161885 A1 | 12/2001 |
| WO | 02/074105 A1 | 9/2002 |
| WO | 2006/094475 A1 | 9/2006 |
| WO | 2008/036836 A1 | 3/2008 |
| WO | WO 2009073397 A1 * | 6/2009 |
| WO | 2010/139292 A1 | 12/2010 |

OTHER PUBLICATIONS

Nongnuch Raksakul Thai et al.: "Production and storage of Chinese style fish sausage from hybrid Clarias catfish", Kesetsart Journal, Bd. 38, Mar. 31, 2004. pp. 102-110, XP002616382.
Oksuz Abdullah et al.: "Production of a dry sausage from African catfish (Clarias gariepinus, Burchell, 1822): microbial, chemical and sensory evaluations", International Journal of Food Science and Technology, Bd. 43, 20. Dec. 20, 2007, pp. 166-172, XP002616383.
Panpipat et al.: "Stability of potassium iodide and omega-3 fatty acids in fortified freshwater fish emulsion sausage", Lebensmittel Wissenschaft Und Technologie, Academic Press, London, GB, Bd. 41, No. 3, Nov. 27, 2007, pp. 483-492, XP022365075, ISSN: 0023-6438, DOI: DOI: 10.1016/J.LWT.2007.03.13.
Juliana Pola Duraes: "Obtencao, caracterizacao da carne mecanicamente separada de barge africano (Clarias gariepinus) e avaliacao de sua estabilidade durante estocagem sob congelamento", Jan. 1, 2009, pp. 1-71, XP002616384, Gefunden im Internet; URL:http//scholar.google.de/scholar?hl+de&q=luliaa+polp+duraes+clarias&lr+&as_ylo=&as vis=0 [gefunden am Jan. 12, 2011 * Zusammenfassung, pp. 24-34.
Peter Nitsch: "Functional Food—Auf die Mischung kommt es an", Fleischverabeitung, Fleischwirtschaft Feb. 2007, pp. 46-51.
Mirco Hilck: "Technologie—Fischoel sucht Fleischwurst", Bruh- und Kochwurstproduktion, Fleischwirtschaft Mar. 2005, pp. 62-64.
Ikuo Ikeda: "Lymphatic transport of EPA and DHA acids as triglyceride, ethyl ester and free acid, and their effect on cholesterol transport in rats". Life Sciences, vol. 52, pp. 1371-1379.
Clemens von Schacky, "Der HS-Omega 3 Index: klinische Wertigkeit standardisierter Fettsaureanalytik", Clinical Chemistry and Metabolism, p. 166-177.
Cunnane SC Plourde M, "Extremely limited synthesis of long chain polyunsaturates in adults: implications for their dietary essentiality and use as supplements", Appl Physiol Nutr Metab, Feb. 2008.
Ikuo Ikeda et al, "Lymphatic transport of eicosapentaenoic and docosahexaenoic acids as triglyceride, ethyl ester and free acid, and their effect on cholesterol transport in rats", Life Sciences, vol. 52, Feb. 1993, pp. 1371-1379.
http://ec.europa.eu/, Health and Consumers, "Ethyl esters (concentrated from fish oils)", Europa—Food Safety—Novel Foods—Introduction.
http://ec.europa.eu/, Health and Consumers, "Novel Food catalogue—What does it mean?", Europa—Food Safety—Novel Foods—Introduction.
Nathan Beach et al.;"Omega-3-Fettsäuren", https://en.wikipedia.org/wiki/Omega-3_fatty_acid?oldid=738885240; pp. 1-15.

* cited by examiner

*Primary Examiner* — Vera Stulii
(74) *Attorney, Agent, or Firm* — Clements Bernard Walker

(57) ABSTRACT

The present invention relates in particular to a raw material for producing minced meat, to a method for producing food items therefrom, to the food items thus obtained and to the use thereof.

11 Claims, No Drawings

SAUSAGE PRODUCTS

The present invention relates to a raw composition for preparing sausage meat, to a process for preparing foodstuffs therefrom, to the foodstuffs thus obtained, and to the use thereof, for example, as fitness products.

Previous sausage products have the disadvantages of having a high fat content, and that the relative physiological protein concentration per 100 g is clearly too low for sports activities, on the one hand and of having mainly and almost exclusively saturated fatty acids and therefore causing or at least accelerating cardiovascular diseases on the other hand. Therefore, previous sausage products are hardly suitable for being marketed in the health, fitness or wellness fields.

WO 2006/094475 A1 describes a process for preparing low fat sausage without admixing additional "empty fats" (the term "empty fats" includes, in particular, saturated fatty acids, especially the saturated fatty acids contained, for example, in bacon, streaky bacon, rind, udder or pig ears), but having to accept considerable losses of taste, because fats are generally ideal flavor carriers that cannot be replaced by vegetable proteins.

The object of the invention is to provide a meat-mix based foodstuff that altogether omits the admixing of usual empty fats, which is compensated by the addition of lean fish meat having a high content of natural marine omega-3 fatty acids (essential fatty acids) present in fish meat, from particular fish species and, if needed, the admixture of essential vegetable and marine omega-3 fatty acids in the form of triglycerides and/or ethyl esters thereof (possible modulations) as well as plant protein isolates, water-soluble and/or oil-based antioxidants, in order that four objects are achieved:
1. optimum taste;
2. avoiding lifestyle diseases even at higher consumption, at best even achieving a positive effect (e.g., cholesterol lowering);
3. continuous metabolization, i.e., possible over 24 hours, by the combination of marine omega-3 fatty acids (EPA and DHA; triglyceride-based) resulting from the fish meat employed, and the additionally admixed omega-3 ethyl ester fatty acids in ultrapure form (approximately 100%). Methods for preparing a fatty acid alkyl ester, for example, by transesterification of triglycerides contained in a wide variety of oils and fats, are well-known, for example, from DE 699 31 897 T2. As compared to triglycerides, omega-3 fatty acid ethyl esters have the advantage of being more hydrophilic and therefore more readily incorporated in emulsions;
   delay effect, i.e., the uptake and metabolization of omega-3 fatty acid ethyl esters is effected more continuously over 24 hours as compared to the natural triglyceride-based omega-3 fatty acids (Ikuo Ikeda. Lymphatic transport of EPA and DHA acids as triglyceride, ethyl ester and free acid, and their effect on cholesterol transport in rats. Life Sciences, Vol. 52, pp. 1371-1379);
4. significant improvement of the taste properties during the storage period, especially of sliced sausages, which clearly remain stable beyond the normal measure of comparable products after completion of the preparation process of the products (prevention of natural decay by the usual maturing process in cooked and precooked sausages).

In a first embodiment, the object of the invention is achieved by a raw composition for preparing sausage meat containing
   a) from 3 to 15 parts by weight of meat and/or meat substitute;
   b) from 0.01 to 20 parts by weight of fish of the species *Clarias gariepinus* and/or *Heterobranchus longifilis* including their crossbreeds; and
   c) from 1 to 5 parts by weight of ice and/or water.

After long test series for the identification of the optimum fish species for being admixed with the classical sausage meat/minced meat on a meat and/or vegetable basis, an improvement of the taste intensity of the starting meat a) employed and the protein breakdown, binding qualities with other protein carriers, water content, consistency of the fish meat, natural fat content as compared to the total fat content (low proportion of empty fats), unexpectedly high content of marine omega-3 fatty acids (EPA and DHA), mineral content, vitamin content (especially vitamin D) and not least the presence of the unpleasant fish taste (pronounced fish smell) are of critical importance, in particular, because the admixture of empty fats was omitted. The fish species that have emerged according to the invention are *Clarias gariepinus* and *Heterobranchus longifilis* including their crossbreeds. In addition, the consistency of these fish species is very similar to that of the meat from mammals. These species have a neutral taste and smell as well as extreme firmness, which have significantly contributed to the fact that the classical minced sausage meat refined with them can dispense with the addition of minor quality fillers, such as bacon or pig ears (empty fats). Of all fish species, those employed according to the invention have the ratio of omega-3 to total fat content that is best for human nutrition. In addition, it was found that a clearly lower amount of spices and/or salts is necessary.

For example, the raw composition according to the invention additionally contains from 0.1 to 10 parts by weight of protein concentrate in the form of four-component protein consisting of milk, whey [lactalbumin, lactoglobulin], chicken and plant (for example, soybean, lupine, pea, potato) proteins, based on 100 parts by weight of components a), b) and c).

The raw composition according to the invention may additionally contain from 0.001 to 1.0 parts by weight of vitamin D and/or free amino acids L-carnitine and/or L-arginine, based on 100 parts by weight of components a), b) and c). In particular, from 2 to 10 g/g of pure L-arginine powder is contained in the raw composition.

Advantageously, the raw composition according to the invention contains a total of at least 0.2 g of vegetable alpha-linolenic acid and/or stearidonic acid per 100 g of meat and/or meat substitute, especially in the form of the triglycerides and/or fatty acid ethyl esters.

Advantageously, the raw composition according to the invention contains a total of at least 0.2 g of docosahexaenic acid and/or eicosapentaenic acid per 100 g of meat by including fish meat without any noticeable fish taste or fish smell during the processing (meat cutting machine).

In the following, alpha-linolenic acid will also be abbreviated as ALA (18:3). In the following, stearidonic acid will also be abbreviated as STA (18:4). In the following, docosahexaenic acid will also be abbreviated as DHA (22:6). In the following, eicosapentaenic acid will also be abbreviated as EPA (20:5).

The necessary fatty acids, especially in the form of the fatty acid ethyl esters (solid [microencapsulated powder or granules] and/or liquid dosage form), are not contained in this concentration in usual meat. By enriching them in foods, the object of the invention can be achieved.

Meat from mammals and meat substitutes within the meaning of the invention does not include fish.

The raw composition according to the invention is suitable, in particular, for the preparation of foods that can also be marketed in the fitness field. Basically low fat sausage products and minced meat products can be refined in this way. Although sausage products and minced meat products become slightly higher fat in this way, this is only by the addition of essential fatty acids rather than by the addition of cholesterol-promoting or cholesterol-forming empty fats. In addition, these two mentioned fish species provide important amino acids and vitamins without at the same time providing undesirable accompanying substances, such as high amounts of empty fats, cholesterol or, after food utilization, uric acid.

It is mainly excessive consumption of meat and meat products with a high content of empty fats that brings about negative effects on the heart and on the whole cardiovascular system; in addition, these increase the risk of oncological diseases and of a raised cholesterol level. For example, if this excessive meat consumption is partially replaced by essential components from fish and marine products (essential fish oils and proteins) as well as plant products (essential vegetable oils and essential plant proteins), this lowers the cholesterol level, the risk of artery diseases in males and females, and of cerebral ictus in elderly people.

The combination of meat products and/or meat substitute products with essential plant protein isolates (for example, from lupine, pea, potato, soybean, lentils, broad beans) and/or fish proteins as well as essential omega-3 fatty acids from plants or fish is clearly useful, supporting and meaningful in the age of anti-aging. A general advantage of the two fish species is a low proportion of connective-tissue containing structures as compared to the protein content. In addition, the connective-tissue protein generally is present mainly as collagen in fish, which more readily undergoes transition to the well dissolvable form of gelatin (glutin). This is why fish quickly becomes overcooked, loose and thus easily digestible. This is also the reason why 93% to 98% of fish protein is taken up, while the taking-up rate of meat protein is not more than 80%. As compared to animal meat, the fat tissue of fish is rich in polyunsaturated fatty acids and contains minerals such as potassium, magnesium and, in particular, phosphorus, and the trace element selenium.

In Germany, there were a total of 367,361 deaths by cardiovascular diseases in 2005 (females 215,087; males 152,274).

These statistics paint a clear picture. Among all causes of death, this one thus takes first place by a wide margin. In this connection, experts criticize that indispensable measures for prevention and rehabilitation are almost completely neglected. In particular, the indispensable providing of information and active changes in awareness within the populations relating to nutrition and exercise take place only marginally.

On the other hand, physicians prescribe more and more medicaments like antihypertensive drugs or pills against high cholesterol levels (such as the drug category of cholesterol-lowering drugs [=statins]).

In order to stop this negative development, this idea underlying the invention has been developed, namely an at least partial substitution of food from meat (sausages and minced meat) by adding essential components from fish; with this idea, it will be possible to change the accustomed and obsolete, from a scientific point of view, consumption behavior (excessive disease-promoting consumption of meat products) to achieve a benefit for the whole economy (improvement of the general health condition of the population). This idea, i.e., to at least partially supplement sausage products, such as cooked and precooked sausages and raw sausages as well as minced meat products, meaningfully with the essential raw material obtained from fish and plant products, brings about an indirect overall increase of awareness in Western populations with respect to the selection of foods. This has been impossible in the previously possible processing of the raw material fish, which has been extremely limited as compared to meat. This missing link in food processing is now filled by the underlying idea. Thus, for the first time in their evolution, the consumer is confronted with meat, sausage and minced meat products refined with essential components, which, in the sum of the above stated properties, meet the requirements demanded by food experts.

The polyunsaturated fatty acids are indispensable components of our cells and basic components for hormones. They are found in various high quality vegetable oils and higher fat fish species, such as salmon, mackerel, sardine and herring. Saturated fatty acids (empty fats) as contained in butter, lard, cheese, sausage and meat, but also coconut fat, cake, sweets and snacks, represent a considerable risk factor. This fat is held responsible for the rise of cholesterol in blood. Therefore, it has been recommended to choose low fat products in the animal variants. Now, with the raw composition according to the invention, classical products such as sausage can be realized that have a high protein content on the one hand, and a high content of polyunsaturated fatty acids on the other.

Polyunsaturated fatty acids, which are abundant, for example, in fish oil, also reduce the incidence of sudden cardiac death. The infusion of polyunsaturated fatty acids (for example, DHA, EPA) has a protective influence on such risk patients (GISSY-P Investigators Study; Lancet).

The raw composition according to the invention is particularly suitable for the preparation of fitness products and food for strength sports people. The less carbohydrates and the more proteins are eaten, the more constant the blood glucose level (glycemic index) remains. Further, a high protein diet favors fat burning. In this connection, it is also important that the body builds up muscle mass from protein. However, the body cannot store protein. Therefore, it must be supplied to strength sports people on a daily basis. A sufficient protein supply in combination with strength training tightens the muscles, reduces fat and strengthens the connective tissue. Evidently, muscle mass can be built up optimally if protein is ingested about 90 minutes before the strength training. To date, it has been necessary to recur to foods like salad with fish or turkey, fish with vegetables or protein shakes with L-carnitine and L-arginine for this purpose.

"Sausage meat" within the meaning of the invention includes both finely ground meat (for example, from a meat cutting machine) and minced meat or coarsely ground meat (for example, from a meat mincer).

"Foodstuff" within the meaning of the invention includes animal feed and food for humans.

"Meat substitute" within the meaning of the invention may comprise or consist of, for example, tofu (soybean protein), lupine, pea, buckwheat, grünkern (unripe spelt grain) or potato.

The meat preferably consists of low fat meat fillet and/or muscle meat and/or meat from the shoulder.

Preferably, the content of vegetable ALA and/or STA (triglyceride and/or ethyl ester) per 100 g of meat is at least 0.2 g to 1 g, especially at least 0.5 g.

The fatty acid necessary for this is an omega-3 fatty acid, which is not naturally present in animal products. The object of the invention can be achieved by enriching foodstuffs with this fatty acid, for example, by adding particular vegetable oils (i triglycerides and/or ethyl ester).

Preferably, the raw composition contains from 0.05 to 10 parts by weight of a glue made of fish and plant protein as well as vegetable oil, wherein said glue contains fish and plant protein and, in particular, at least 10% by weight, especially at least 25% by weight, of vegetable oil and/or fish oil. The glue within the meaning of the invention not only provides for a pleasant texture of the foodstuff and a good cohesion of the different ingredients, but may also refine the foodstuff because of the particular composition of the glue, mainly in its health-promoting activity.

The fish meat of the glue also originates from the species *Clarias gariepinus* and/or *Heterobranchus longifilis* including their crossbreeds, because of their ideal and unrivaled properties.

The glue preferably contains from 30 to 70% by weight of a basic emulsion containing from 40 to 70% by weight of meat and/or fish, from 20 to 50% by weight of water and/or ice, and from 5 to 15% by weight of fat parts of fish and/or vegetable oil. The fat parts of the fish result, for example, from the so-called belly flaps, the fat-containing belly parts of the fish. More preferably, the basic emulsion contains from 50 to 65% by weight of fish and, independently thereof, more preferably from 25 to 40% by weight of water and/or ice.

The "glue" within the meaning of the invention is a composition that refines the product and at the same time has a positive influence on the consistency or texture of the product.

In addition to the optimization of the consistency of the sausage meat (glue property) and taste improvement, the glue was developed in order to preferably have an additional property, namely the possibility to actively modulate the relations between EPA and DHA, refinement or enriching of the mixed sausage meat (including natural matrix with natural [triglycerides]), specific omega-3 fatty acid ethyl ester, EPA and DHA, and preferably of the additional vegetable ALA and/or STA non-typical of fish (C 18:3 and/or 18:4; on triglyceride and/or ethyl ester basis), respectively at a ratio of from 2 to 10, especially in the optimum mixing ratio of 5 parts of alpha-linolic acid, to one part of EPA/DHA. During the multistage preparation process, an optimum distribution or "absorption" (enrichment) of the corresponding essential ethylated omega-3 fatty acids is obtained because of a very high rotation speed/min in the mixing process, for example, from the "breakdown" process. If the corresponding proportion or the individual proportion of the respective essential fatty acids should be too low in the emulsifying and analyzing process, the individual emulsions can be optimized at any time by corresponding oil derivatives (triglyceride and/or ethyl ester basis). Surprisingly, in the test series relating to the refinement process, it could be found that additionally supplied oil derivatives and animal and plant proteins may also very well be incorporated in the emulsion process. Especially in the emulsion F concentration (=fish oils; part containing fish oil b), a significantly higher concentration of EPA and DHA from the fish tissue is achieved by the "breakdown" process (e.g., the omega-3 ethyl ester content in 100 g of normal meat is <0.01% by weight; however, in the glue according to the invention, the content is at least 5% by weight, for example), and still the emulsion does not "break down".

Further, the glue preferably comprises a part containing vegetable oil (a) and a part containing fish oil (b), wherein
  the weight ratio of the part containing vegetable oil (a) to the part containing fish oil (b) is within a range of from 3:1 to 15:1;
  the part containing vegetable oil (a) contains from 40 to 90% by weight of vegetable oil and from 10 to 60% by weight of basic emulsion; and
  the part containing fish oil (b) contains from 40 to 75% by weight of fish oil and from 25 to 60% by weight of basic emulsion.

The weight ratio of the part containing vegetable oil (a) to the part containing fish oil (b) is preferably within a range of from 5:1 to 10:1.

According to the present invention, it is particularly preferred if the part containing vegetable oil (a) contains from 45 to 70% by weight of vegetable oil and from 30 to 55% by weight of basic emulsion. Irrespective thereof, it is further particularly preferred if the part containing fish oil (b) contains from 45 to 65% by weight of fish oil and from 35 to 55% by weight of basic emulsion.

The raw composition or the glue preferably contain at least one water-soluble antioxidant, especially citric acid and/or ascorbic acid. In particular, a combination of citric acid and ascorbic acid enables the preparation of particularly oxidation-stable emulsions.

The plant protein preferably contains protein isolates from lupines and/or peas. It is advantageous that the use of protein isolates involves a good emulsifying effect despite the lowering of the pH value and the accompanied deteriorated solubility of proteins from the addition of the citric acid and/or ascorbic acid.

The term "fish meat" within the meaning of the invention exclusively relates to the two species *Clarias gariepinus* and/or *Heterobranchus longifilis*. It is exactly these fish species that meet the desired properties. In particular, the good binding properties have the result that additional conventional binders of chemical nature can be dispensed with in part or completely.

The raw composition for preparing a foodstuff according to the invention contains meat and/or meat substitute that may preferably contain from 50 to 90 parts by weight of meat mass and from 5 to 20 parts by weight of vegetable oil. Advantageously, the raw composition also contains from 5 to 20 parts by weight of ice, for example, in order that the raw composition can be further processed in a meat cutting machine for comminuting.

All in all, the meat mass for preparing the raw composition, such as sausage meat or minced sausage meat, is derived from low fat meat parts, such as fillet, shoulder and/or muscle meat.

From 0.1 to 10 parts by weight of protein, especially as a concentrate in the form of four-component protein consisting of milk, whey [lactalbumin, lactoglobulin], chicken and plant (for example, soybean, lupine, pea, potato) proteins, may preferably be added to the raw composition according to the invention.

These high quality protein sources are particularly suitable for fitness products and strength sports. While people who do not do sports should take up 0.8 g of protein per kg of body weight per day, strength sports people should take up as much as 1.8 to 2.5 g. This means that a body builder weighing 90 kg, for example, would have to take up 225 g of protein per day, which corresponds to an amount of 1.3 kg of beef. Now, with the raw composition according to the invention, it is possible to meet the protein demand more efficiently. The foodstuff according to the invention or the raw composition according to the invention can be employed as a protein concentrate because of its being enriched with high quality protein. The natural concentration of protein in previously known comparable products is about from 16 to 21% by weight. With the raw composition according to the invention, a significantly higher concentration can be achieved by adding the plant and/or animal protein.

In another embodiment, the object of the invention is achieved by a process for preparing a foodstuff that is characterized in that a raw composition according to the invention is comminuted, thoroughly mixed, filled into casings, for example, and heated to a temperature of from 40 to 85° C. for a period of 30 to 240 min.

Preferably, a raw composition containing from 50 to 90 parts by weight of meat mass is comminuted, thoroughly mixed, and heated to a temperature of from 40 to 85° C. for a period of 30 to 240 min. Advantageously, it is subsequently packaged to form the finished product.

Preferably, after comminuting, 5 to 20 parts by weight of vegetable oil is added to the raw composition. For example, after the comminuting, the raw composition is refined by the above mentioned glue according to the invention.

The process according to the invention is useful, for example, for preparing animal feed or food for humans, such as minced meat, fish fingers, doner kebab, sausage products, such as raw sausages, cooked and precooked sausages, spreadable cooked sausages, meatballs, patties, fitness products or meat pies. Thus, the process according to the invention provides for the use of meat mass as the main component. However, alternatively, it is also possible to dispense with meat entirely if a meat substitute is employed.

In addition, supplements, such as vitamins, minerals, trace elements, enzymes and/or pharmaceutically active substances, for example, can be admixed with the process product during the preparation process, in order to optimize the medical benefit according to needs.

It is a process that uses meat and/or purely vegetable starting materials, fish or optionally additional protein concentrate for the preparation of foodstuffs or animal feed.

With the present process, for example, sausage meat is used to produce low fat meat products (raw sausages etc, see above) that are neutral in terms of fish taste and fish smell and comprise, in particular, sufficient amounts (therapeutic benefit) of essential fatty acids (EPA and DHA [triglycerol and/or ethyl ester basis]), but also the omega-3 fatty acids that only occur in plants [ALA and/or STA]. Preferably, the natural "refinement" (meaning enrichment) of the sausage meat is to consider the mixing ratio respectively recommended by leading scientists (see breast milk mixing ratio of omega-3 fatty acids and concentrations) between ALA and STA vs. EPA and DHA, but also between EPA and DEHA (this is only possible by using "pure" ethyl ester of the omega-3 fatty acids). This so-called natural manner of refining the meat mix products will achieve an evidently positive, health-promoting or health-preserving effect when consumed on a regular basis. Further, the refinement of the meat mix products with omega-3 fatty acid ethyl ester is supposed to achieve such a high concentration as needed, in order that a health-promoting therapy can be initiated with chronically ill people. In addition, all the meat mix products preferably have a consistency that is very firm and yet pliable, and the meat products should have a high storage stability.

The plant protein isolate(s) is (are) processed with water and water-soluble antioxidants (ascorbic acid and/or citric acid) in the basic emulsion, advantageously in a colloid mill and a toothed-ring dispersing machine.

Advantageously, essential vegetable oils and/or fish oils are added to the raw composition. The disadvantages of the formation of diseases as mentioned in the prior art cam be eliminated even more easily thereby.

The comminuting of the raw composition, for example, into sausage meat or minced sausage meat, is preferably effected in a meat cutting machine, meat mincer and/or a meat grinding device. In the meat cutting machine, for example, a shear rate within a range of from 1000 to 3000 $s^{-1}$ is employed.

Preferably, part of the raw composition is minced, and the rest is crushed. This achieves a particularly coarse-grained texture, which is particularly similar to that of the previously known meat products.

In the process according to the invention, frozen meat mass or frozen meat or frozen fish is preferably employed. In particular, the meat mass can be processed both in a frozen and in a thawed state. Thus, the comminuting of the raw composition can take place, for example, in a meat cutting machine even without the addition of ice.

In the process according to the invention, a raw composition having a vegetable oil content of at least 5% by weight is advantageously employed. Thus, the polyunsaturated fatty acids contained particularly in vegetable oil can be incorporated to a higher extent into the foodstuffs according to the invention. Therefore, particularly useful vegetable oils include walnut oil, rapeseed oil, linseed oil, chia oil, hemp oil, soybean oil, perilla oil; oils from the Boraginaceae plant family, black currant seed oil, or a mixture of at least two of these oils. Therefore, any combination of two of the mentioned oils is particularly preferred. For minced sausage meat, comminuted breadcrumbs may also be employed for improving the binding. Denatured plant proteins (for example, soybean, lupine, potato, pea, millet or green algae) and/or whey proteins (milk protein) may also be added to the raw composition, especially the sausage meat or the minced sausage meat.

In the process according to the invention, the following ingredients may also be added to the raw composition: phosphate, salt, nitrite salting mix, vegetables, broth, substances containing L-carnitine, flavoring agents, flavor carriers, natural supplements, such as vitamins, minerals and trace elements, probiotic bacteria, synthetic supplements, pharmaceutically active substances, drug-like substances, such as substances containing L-carnitine (for example, L-carnitine obtained by the natural biological Carnipure® process or from Liebig's extract, and not from the unnatural, chemically prepared D-carnitine), or texturizing agents, such as breadcrumbs. L-Carnitine of all ingredients can support fat burning. Therefore, it is often recommended to ingest about 1 g of L-carnitine 30 minutes before the exercise. Owing to its important and basic functions in energy metabolism, endurance, strength and hobby sports people, in particular, humans undergoing a weight reduction diet, pregnant and breast-feeding women, especially elderly people, vegetarians, diabetics, generally people who want to promote and preserve their health, may ingest from 1 to 3 g/day with food intake.

In another embodiment, the object of the invention is achieved by a foodstuff that can be prepared by the process according to the invention. Preferably, the ω-3 fatty acid content is at least 1% by weight, especially at least 5% by weight, even more preferably at least 10% by weight, based on the foodstuff. With a taste that remains the same as compared to pure meat products, the foodstuff according to the invention can thus prevent lifestyle diseases, such as arteriosclerosis, by the ω-3 fatty acids (obtained from the essential fish components) displacing the ω-6 fatty acids that adversely affect the consumers' health (arachidonic acid, classical fat-containing sausages), even preventing the conversion thereof to inflammatory substances, so that the formation of the health-endangering thrombaxene (inflammatory substance) is directly counteracted.

The foodstuff advantageously contains from 5 to 20 parts by weight of vegetable oil and from 5 to 90 parts by weight of meat mass. Advantageously, at least 50 parts by weight, especially at least 60 parts by weight, of meat mass is contained.

Advantageously, the vegetable oil is homogeneously mixed with the meat mass, so that the vegetable oil cannot be distinguished from the meat mass, at least not with the naked eye. This foodstuff according to the invention is preferably designed to have the same taste as commercially available meat products admixed with empty fats. According to need, various meat flavors may also be admixed. Thus, the foodstuff according to the invention can replace previously offered meat products and compensate the disadvantages described in the prior art.

In addition, the foodstuff according to the invention preferably comprises minced meat, fish fingers, a meatball, a gyro type meat, such as doner kebab, a pasta filling, such as for maultaschen (Swabian filled pasta), a sausage, a patty, or a meat pie.

In another embodiment, the object of the invention is achieved by using the raw composition according to the invention for preparing animal feed or food for humans, such as minced meat, fish fingers, doner kebab, gyro type meats, sausages, meatballs, patties or pasta fillings, such as maultaschen.

The glue is advantageously obtained by mixing at least one oil and denatured plant protein or fish meat to form a basic emulsion, which is prepared at first in a rotating vessel at a rotational speed within a range of from 5,000 to 25,000 revolutions/minute, especially from 10,000 to 20,000 revolutions/minute. This process is also referred to as "breaking up" the basic emulsion.

The incorporation of at least one plant protein isolate (lupine, pea, potato, alga, soybean, bean, lentils) is effected, for example, by means of a spiral agitator or a colloid mill, and the optional incorporation of omega-3 fatty acids into the glue consisting of vegetable oil and fat- or oil-soluble antioxidant is preferably effected under a protective gas atmosphere, which is characterized by the exclusion of oxygen and, for example, 80% $N_2$ and 20% $CO_2$.

The mixture of water, fish protein and antioxidant is charged into a dispersing unit (either a toothed-ring dispersing machine or a colloid mill). The mixture is circulated by pumping, and at the same time, the oil mixture is continuously metered in. The dispersing unit distributes and emulsifies the oil phase homogeneously in the "aqueous" phase. This process takes place at temperatures below 20° C. if possible, preferably below 10° C.

In the process according to the invention, the basic emulsion is at first divided into two parts, for example, and each part is subsequently admixed with vegetable oil or fish oil to obtain the part containing vegetable oil or the part containing fish oil, respectively.

The invention also includes the incorporation of at least one fat- or oil-soluble antioxidant into the glue to form a mixture of vegetable oil, plant protein, fish meat, omega-3 ethyl ester, and fat- or oil-soluble antioxidant, wherein the incorporation of omega-3 fatty acid ethyl ester into the mixture of the glue, in particular, is effected under a protective gas atmosphere.

The preparation of the basic emulsion can be effected, for example, by mixing the base materials in a homogenizer or in a high-pressure homogenizer.

The glue is then homogenized in said homogenizer or high-pressure homogenizer. In this process, the oil droplets, which were previously uniformly distributed, are heavily comminuted and stabilized. The emulsion obtained by the homogenization process is stored as cool as possible, under exclusion of light and oxygen, for further use, or directly incorporated into the meat mixture in an analogous way.

EXAMPLES

Example 1

Preparation of Fish-Beef Sausage (Fitness Cooked Sausage, Lyon Style)

| Ingredient | Amount [% by weight] | Amount [g] |
|---|---|---|
| Meat, beef, lean | 28.14 | 6,000.00 |
| Meat, fish | 37.52 | 8,000.00 |
| Ice, −20 to −50° C. | 15.95 | 3,400.00 |
| Nitrite salting mix | 0.89 | 190.00 |
| Phosphate | 0.25 | 52.50 |
| Spices | 0.53 | 114.00 |
| Glue* | 3.99 | 850.00 |
| Antioxidants (citric acid and ascorbic acid) | 0.35 | 75.00 |
| Protein concentrate in the form of four-component protein (90%) | 8.82 | 1880.00 |
| L-Carnitine | 0.89 | 190.00 |
| L-Arginine | 2.67 | 570.00 |
| Total [g] | 100.00 | 21,321.50 |
| Revolutions per minute of meat cutting machine [rpm] | | 1800 |
| Time spent in meat cutting machine [min] | | about 8 |
| Temperature reached [° C.] | | 8 |
| Addition of glue after ⅔rds of the time spent in meat cutting machine Mixing Filling | | |
| Cooking temperature [° C.] | | 72 |
| Cooking time [min] | | 120-150 |
| Cooling temperature [° C.] | | 6 |

*see Example 4

Example 2

Preparation of a Fish, Soybean and Pork Sausage with Pea Protein

| Ingredient | Amount [% by weight] | Amount [g] |
|---|---|---|
| Meat, fish | 36.47 | 7,000.00 |
| Meat, pork | 31.26 | 6,000.00 |
| Meat, soybean | 10.42 | 2,000.00 |
| Ice, −20 to −50° C. | 15.63 | 3,000.00 |
| Nitrite salting mix | 0.68 | 130.00 |
| Spices | 0.09 | 18.00 |
| Glue* | 5.05 | 970.00 |
| Antioxidants (citric acid and ascorbic acid) | 0.40 | 76.39 |
| Total [g] | 100.00 | 19,194.39 |
| Revolutions per minute of meat cutting machine [rpm] | | 1700 |
| Time spent in meat cutting machine [min] | | about 8 |
| Temperature reached [° C.] | | 08 |
| Addition of glue after ⅔rds of the time spent in meat cutting machine Mixing Filling | | |
| Cooking temperature [° C.] | | 72 |
| Cooking time [min] | | 120-150 |
| Cooling temperature [° C.] | | 6 |

*see Example 4

Example 3

Preparation of a Fish-Beef Meatball

| Ingredient | Amount [% by weight] | Amount [g] |
|---|---|---|
| Meat, beef, lean | 53.99 | 7,000.00 |
| Meat, fish | 23.14 | 3,000.00 |
| Ice, −20 to −50° C. | 9.26 | 1,200.00 |
| Breadcrumbs | 2.31 | 300.00 |
| Eggs | 3.86 | 500.00 |
| Spices | 0.88 | 114.00 |
| Glue* | 6.56 | 850.00 |
| Total [g] | 100.00 | 12,964 |
| Revolutions per minute of meat cutting machine [rpm] | | 750 |
| Time spent in meat cutting machine [min] | | about 8 |
| Temperature reached [° C.] | | 8 |
| Addition of glue after ⅓rd of the time spent in meat cutting machine | | |
| Mixing | | |
| Portioning | | |
| Optionally shock freezing | | −20° C. |
| Cooling temperature [° C.] | | 6 |

*see Example 4

Example 4

Glue (= refined emulsions) prepared as follows:

Basic emulsion (= BE) consisting of: fish meat 40% by weight, denatured plant protein (pea, soybean, lupine) 10% by weight, water 42% by weight, ice 5.0% by weight, water-soluble antioxidants 3.0% by weight ( ascorbic acid and citric acid), is divided into 2 fractions

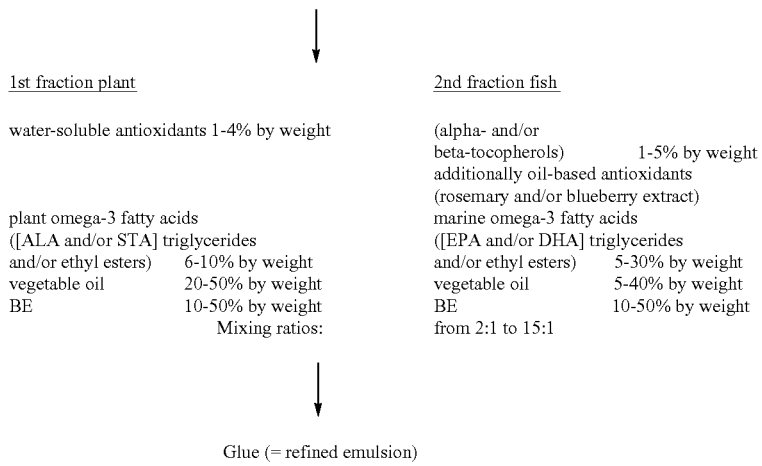

1st fraction plant water-soluble antioxidants 1-4% by weight plant omega-3 fatty acids
([ALA and/or STA] triglycerides
and/or ethyl esters)   6-10% by weight
vegetable oil   20-50% by weight
BE   10-50% by weight 2nd fraction fish (alpha- and/or
beta-tocopherols)   1-5% by weight
additionally oil-based antioxidants
(rosemary and/or blueberry extract)
marine omega-3 fatty acids
([EPA and/or DHA] triglycerides
and/or ethyl esters)   5-30% by weight
vegetable oil   5-40% by weight
BE   10-50% by weight Mixing ratios: from 2:1 to 15:1

Glue (= refined emulsion)

Preparation of an Embodiment of 100 g of Glue with 10% Omega-3 Fatty Acid (Triglyceride and/or Ethyl Ester):

Basic Emulsion:

Step A

1. First, 42 g of water was warmed to at least 20° C. up to at most 80° C.
2. Subsequently, 1.0 g of citric acid and 2.0 g of ascorbic acid were stirred into the water.
3. Mixing of 10 g of plant protein isolate and/or isolates by means of a colloid mill, rotor/stator gap=1 mm, mixing time 5 minutes, cooling at 20° C.

Step B

4. Comminuting 40 g of fish meat and/or meat with 5 g of ice in a meat-cutting machine at 1700 rpm at increasing temperature up to a maximum of 9° C.

Step C=Mixing of steps A and B

5. Charging the emulsified plant solution in a toothed-ring dispersing machine, admixing the comminuted fish and/or meat emulsion to emulsify a total mass.

I. Fraction (46% by Weight Basic Emulsion), Plant Base

1. Charging 50 g of rapeseed oil, admixing 4.0% by weight water-soluble antioxidants (citric acid and/or ascorbic acid) by means of a laboratory toothed-ring dispersing machine, 3 min at 15,000 rpm, T=20° C.

II. Fraction (38% by Weight Basic Emulsion), Fish Base

1. Charging 30 g of rapeseed oil, admixing alpha- and/or beta-tocopherols 1-5% by weight, and 2.0 g of rosemary and/or blueberry extract by means of a laboratory toothed-ring dispersing machine, 3 min at 15,000 rpm, T=20° C., admixing 30 g of omega-3 fatty acids (triglycerides and/or ethyl esters [omega-3>90% EE]) at 9,000 rpm for 1 minute at 20° C.

Finishing the Glue at a Ratio of 2:1 (Final Emulsion, According to Need)

1. Charging the plant-based emulsion in a toothed-ring dispersing machine, admixing and emulsifying the fish-based fraction under 700 mbar of vacuum at 15° C. for 20 minutes at a revolutions per minute of 4,500 rpm.

2. Homogenization of the glue by means of a high-pressure homogenizer at 500 to 1500 bar, one-step, temperature 15-20° C.

3. Optionally packaging the glue under vacuum or protective gas (80% $N_2$, 20% $CO_2$), cooling at 1° C.

The invention claimed is:

1. A raw composition for preparing sausage meat containing
   a) from 3 to 15 parts by weight of meat and/or meat substitute;
   b) from 0.01 to 20 parts by weight of fish of the species *Clarias gariepinus* and/or *Heterobranchus longifilis* including their crossbreeds; and c) from 1 to 5 parts by weight of ice and/or water, wherein
d) said raw composition contains a total of at least 0.2 g of vegetable alpha-linolenic acid and/or stearidonic acid in the form of triglycerides and/or ethyl esters per 100 g of meat and/or meat substitute, and
e) said raw composition contains a total of at least 0.2 g of docosahexaenic acid and/or eicosapentaenic acid per 100 g of meat and/or meat substitute, wherein the docosahexaenic acid and/or eocosapentaenic acid are present as ethyl esters thereof, and from 0.05 to 10 parts by weight of a glue, said glue comprising a part containing fish and at least 10% by weight of vegetable oil, said glue containing 30 to 70% by weight of a basic emulsion, wherein said basic emulsion contains:

from 40 to 70% by weight of fish and/or meat,
from 20 to 50% by weight of water and/or ice, and
from 5 to 15% by weight of fat parts of fish and/or vegetable oil,
wherein the basic emulsion contains a first fraction plant of:
1-4% by weight of water soluble antioxidants;
6-10% by weight of plant omega-3 fatty acids triglycerides and/or ethylesters;
20-50% by weight vegetable oil; and
wherein the basic emulsion contains a second fraction fish of
1-5% by weight of fat or oil based antioxidants,
5-30% by weight of marine omega-3 fatty acids triglycerides and/or ethylesters,
5-40% by weight of vegetable oil; and
in a mixing ratio of the 1. fraction of plant to the 2. fraction of fish from 2:1 to 15:1.

2. The raw composition according to claim 1, characterized by additionally containing from 0.1 to 10 parts by weight of protein concentrate in the form of four-component protein consisting of milk, whey, chicken and plant proteins.

3. The raw composition according to claim 1, characterized by additionally containing from 0.001 to 1.0 parts by weight of vitamin D and/or free amino acids L-carnitine and/or L-arginine.

4. The raw composition according to claim 1, characterized in that walnut oil, rapeseed oil, linseed oil, chia oil, hemp oil, soybean oil, perilla oil; oils from the Boraginaceae plant family, black currant seed oil, or a mixture of at least two of these oils is employed as said vegetable oil.

5. A process for preparing a raw composition according to claim 1, characterized in that the ingredients are comminuted by using a meat cutting machine and/or a meat mincer.

6. The process according to claim 1, characterized in that said glue is obtained by mixing said oil or oils with the basic emulsion, which is first prepared in a rotating vessel at a rotational speed within a range of 5,000 rpm to 25,000 rpm.

7. The process according to claim 5, characterized in that said raw composition is comminuted, admixed and heated at a temperature of 40 to 85° C. for a period of 30 to 240 min.

8. The process according to claim 6, characterized in that said basic emulsion is prepared in a centrifuge or meat cutting machine.

9. A raw composition for preparing sausage meat according to claim 1, characterized in that said raw composition contains ω-3 fatty acid content which is at least 1% by weight.

10. A raw composition for preparing sausage meat according to claim 1, characterized in that said foodstuff for humans or animals comprises minced meat, fish fingers, doner kebab, sausage, sausage products, especially cooked and precooked sausages, spreadable cooked sausages, meatballs, patties, fitness products or meat pies.

11. The raw composition according to claim 2, wherein said plant proteins are from soybean, lupine, pea and/or potato.

* * * * *

UNITED STATES PATENT AND TRADEMARK OFFICE
CERTIFICATE OF CORRECTION

PATENT NO. : 10,537,126 B2
APPLICATION NO. : 13/502441
DATED : January 21, 2020
INVENTOR(S) : Andreas Nuske Page 1 of 1

It is certified that error appears in the above-identified patent and that said Letters Patent is hereby corrected as shown below:

On the Title Page

Column 1, item (30) Foreign Application Priority Data:
Change "Oct. 21, 2009 (DE) ............... 10 2009 050 245"
To Oct. 21, 2009 (DE) ............... 10 2009 050 245.9

Signed and Sealed this
Seventeenth Day of March, 2020

Andrei Iancu
*Director of the United States Patent and Trademark Office*